March 3, 1936. A. C. WOOD 2,032,783
CONTAINER FOR FROZEN CONFECTIONS
Filed Jan. 5, 1934
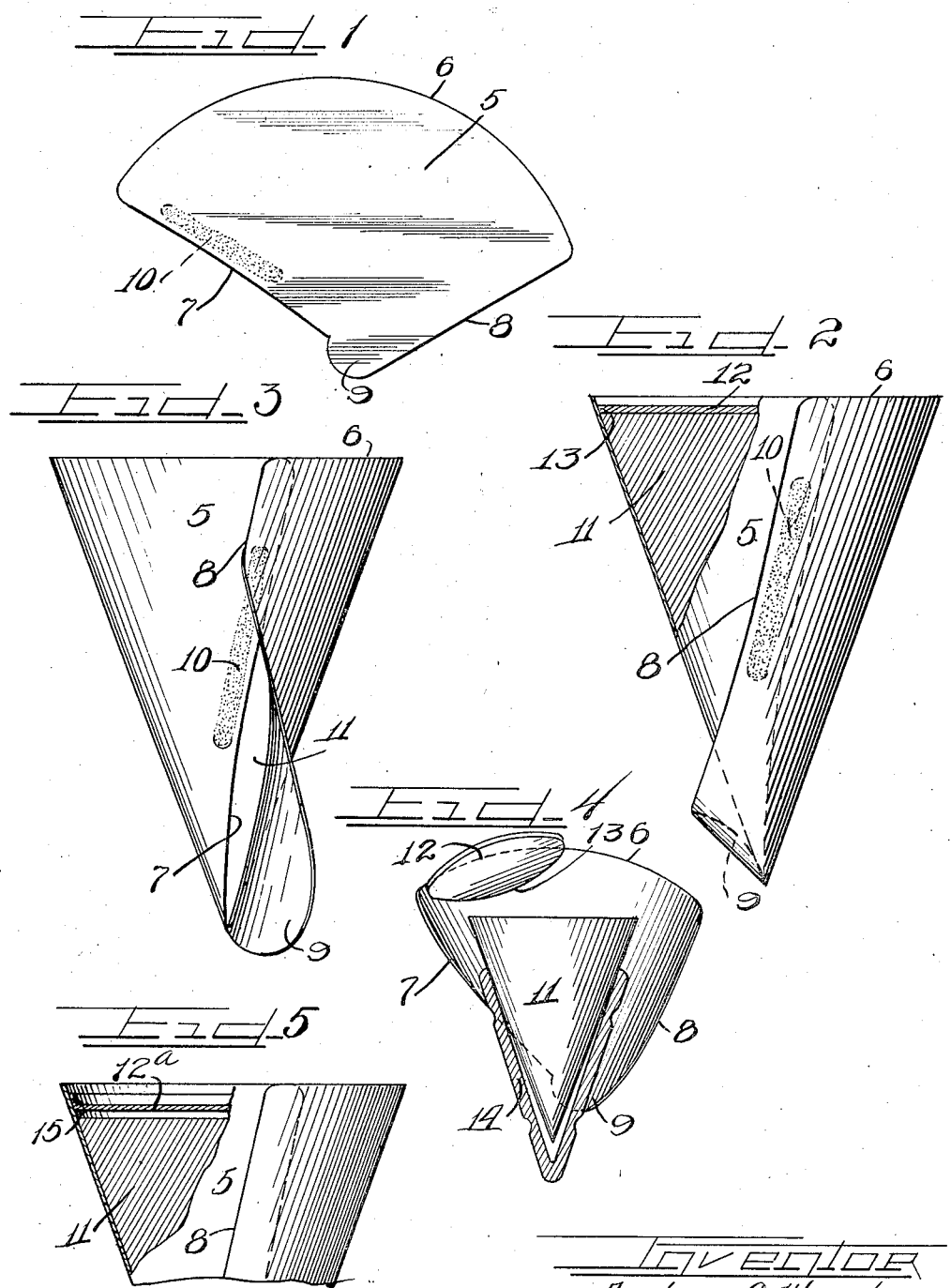

Patented Mar. 3, 1936

2,032,783

UNITED STATES PATENT OFFICE 2,032,783

CONTAINER FOR FROZEN CONFECTIONS

Andrew C. Wood, Chicago, Ill., assignor to Vortex Cup Company, Chicago, Ill., a corporation of Illinois Application January 5, 1934, Serial No. 705,305

5 Claims. (Cl. 229—51)

This invention relates to the packaging and dispensing of confectionaries and more particularly to a method of packaging and dispensing confectionaries such, for example, as ice cream in a sanitary cup of paper or similar material.

The practice of dispensing small portions of frozen confectionaries such as ice cream in cones and dishes for immediate consuming by the purchaser has recently undergone a change from the old method of scooping a ball of ice cream from a bulk container and disposing it in a dish or edible cone. The newer practice consists in freezing the confection in a cup of paper or similar material and subsequently removing the cup from the confection when the latter is served. Such practice is very sanitary and insures that each purchaser receive the proper amount. Some difficulty has been experienced in the practice of the newer method, namely, that an attendant serving the confection would frequently contact the confection with his naked hand or fingers while removing the cups. In other instances, the cup or container was more than desirably difficult to remove from the confection, and in still other instances, means other than the container in which the confection was frozen had to be employed for best results to hold or support the confection while the container was being removed.

With the foregoing in mind, it is an object of this invention to provide a new method of packaging and dispensing a confection such as ice cream in such a manner that the confection is contained in a sanitary cup which is removed from the confection very readily and without any danger of the attendant's hand coming in contact with the confection.

Another object of this invention is the provision of a method of dispensing a frozen confection consisting of freezing the confection in a cup of paper or similar material and subsequently stripping the cup upwardly from the bottom thereof to free the frozen confection.

A still further object of this invention is the provision of a method of dispensing a frozen confection, consisting of forming a blank into a cup of a given shape, freezing the confection within the cup, and subsequently restoring the blank to its original shape, thereby freeing the confection.

It is also an aim of this invention to provide a novel method of packaging and dispensing a frozen confection consisting of providing a blank having a tear tab projecting therefrom, forming the blank into a cup, freezing the confection in the cup, and subsequently freeing the confection by a simple pull upon the tear tab.

Still a further object of this invention is the provision of a method of packaging and dispensing a frozen confection in a cup of paper or similar material using a cover over the confection in the container, and so mounting the cover in position, that when the container is stripped from the confection, the cover is automatically removed with the container.

It is also an object of this invention to provide a cup for the packaging and dispensing of a frozen confection, said cup having a cover thereon attached to the cup in such a manner as to be automatically removable with the cup when the cap is stripped from the frozen confection.

While some of the more salient features, characteristics, and advantages of a method embodying this invention have been above pointed out, others will be come apparent from the following disclosure.

The invention includes these and other process steps, a method of accomplishing the present invention being shown in the drawing, as more particularly indicated by the claims.

On the drawing:

Figure 1 shows a plan view of a form of blank that may be used in performing the present invention.

Figure 2 is an elevational view, partly in section, and disclosing a more advanced stage of the method, showing the blank formed into a cup containing a frozen confection.

Figure 3 is an elevational view similar to Figure 2, showing the blank partially stripped from the confection.

Figure 4 is a reduced elevational view illustrating the freeing of the confection from the blank and the disposition of the same into an ice cream cone.

Figure 5 is a reduced fragmentary view similar to Fig. 2, showing a modified cap in use.

As shown on the drawing:

In the structure arbitrarily selected to illustrate the performance of the present method, there is shown a blank 5, preferably made of paper of the character used in paper drinking cups, but which may be made of any suitable material. The blank illustrated is designed to be formed into a conical cup, and is in the form of a segment of a circle having an arcuate or curved outer edge 6 for defining the mouth of the conical cup. The curved edge 6 terminates in inwardly converging side edges 7 and 8, of which, edge 8 is substantially a straight edge, while edge 7 is slightly curved inwardly to facilitate manufacture.

These edges 7 and 8 terminate at their inner extremities in a curved lateral extension or stripping tab 9 which is substantially flush with edge 8, but projects outwardly away from edge 7.

Along one of the side edges of the blank, in this instance side edge 7, a tab of glue or adhesive 10 of any suitable character is disposed for uniting overlapping, marginal portions of the blank as best seen in Figure 2. Inasmuch as the blank and cup to be formed therefrom is especially adapted for use in connection with frozen confection, such as ice cream, it will of course be appreciated that it is not necessary to provide a seal along the entire overlapping margins of the cup. It is also unnecessary to provide a seal at the apex of the cup, since the confection is preferably deposited in the cup in a semi-liquid state and will not seek a way out of the cup through the unglued portion. The absence of the glue near the apex of the cup also leaves the stripping tab entirely free where it may be more easily taken hold of and the cup stripped from the frozen confection more readily.

In practicing the present method, the blank 5 is rolled into a conical cup as seen in Figures 2 and 3. The rolling operation may be effected by any suitable equipment such, for example, as is now in use in the manufacture of conical paper drinking cups. It will be seen that after the cup is formed, with the overlapping marginal portion adjacent edges 7 and 8 held together by the glue 10, the stripping tab 9 projects away from the body of the cup where it is readily accessible.

The next step is to place a confection 11, such as ice cream, in the cup, filling the cup to a desired extent. The confection is preferably put in the cup in a partially frozen or semi-liquid condition.

This confection 11 is frozen to a desirable extent while in the formed cup, assuming the position shown in Figs. 2 and 3.

Either before or after the freezing operation, as may be deemed more feasible, a cover 12, if the same is desired, is placed over the confection 11, and this cover is preferably secured along its marginal edge as indicated at 13 to the blank. For securing the cover, a glue is preferably used which is sufficient in its adhesive characteristics to prevent ready separation of the cover from the blank. The glue may be applied to the cover partially or entirely around the edge thereof.

When the foregoing has been accomplished, the confection packed in the sanitary container is ready for distribution and may be shipped to the retail shop packed in ice.

When making a sale, it is a simple expedient for the confectionary dealer to hold the container in one hand, grasp the stripping tab 9 with the other hand, and, by pulling upon this tab, strip the blank or cup from the confection, the marginal portions of the blank held by the adhesive 10 readily separating, since this adhesive is of such an amount and character as to hold the blank in cup formation, but is insufficient to preclude ready separation of the marginal portions. When the marginal portions of the blank have been separated, the confection slides readily out of the now open cup into an edible cone 14 or any other device from which it is to be consumed by the purchaser. Of course, the cone 14 may be held in a suitable holder if desired.

As seen better in Figure 5, a different cover 12a may be used, if a cover is deemed necessary. This cover 12a is preferably provided with an upwardly extending flange 15, and the cover is preferably spaced above the confection 11 so as not to contact the confection. The flange 15 is glued or otherwise attached to the blank 5, and is preferably attached to the blank throughout a portion of the circumference of the flange 15 in a manner to preclude ready separation. That portion of the flange adjacent the overlapped marginal portions of the blank is preferably free from the blank or very lightly attached thereto, so as not to interfere with the separation of such marginal portions and the sufficient expanding of the blank during the stripping operation.

From the foregoing, it is apparent that, in the present invention, it is not necessary to actually tear the blank in stripping it from the confection. When the marginal edges are separated, the blank merely assumes its original form and the confection slips off the blank.

If the cover 12 has been used, and glued to the blank, as mentioned hereinabove, this cover will be automatically removed from the confection and adhere to the blank during the stripping operation, as indicated in Figure 4.

From the practice of the present method, it will be apparent that the purchaser is assured of absolute cleanliness relative to the product he is buying, and is also assured of receiving the same measure of confection as is being dispensed to other customers at the same price. It will also be noted that the confectionary dealer is provided with a simple and very rapid sanitary method of serving the confection to the purchaser.

Now, I of course, desire it understood that, although I have illustrated one form of apparatus by which the present invention may be carried out, and described in detail the preferred procedure of the method, the invention is not to be thus limited but only insofar as defined by the scope and spirit of the appended claims.

I claim as my invention:

1. As an article of manufacture, a container for a frozen confection such as ice cream, including a blank formed into a cup of a given shape with certain marginal portions of said blank overlapped, said marginal portions being attached together in such a manner as to retain the said given shape but insufficiently to preclude ready separation when the cup is stripped from a frozen confection, and a cover in said cup fixedly attached to a portion of the blank in a manner to preclude interference with the separation of said marginal portions during the stripping operation.

2. As an article of manufacture, a container for a frozen confection such as ice cream, comprising a blank folded into container form with separable portions to permit stripping of the container from its contents, and a cover for said container fixedly secured to said blank in a manner not to interfere with the separation of said separable portions, whereby said cover will remain on said blank when the container is stripped from the confection.

3. As an article of manufacture, a paper container having separable portions to permit the container to be stripped from its contents, and a cover set within the mouth of the container and peripherally secured to said container along a region away from said separable portions.

4. As an article of manufacture, a container for a frozen confection such as ice cream, comprising a paper blank shaped into container form with separable portions to permit stripping of the container from a confection, and an initially separable cap for said container secured along a peripheral portion to said blank, said cap being free from said blank adjacent said separable margins so that said cap will remain secured to said blank when the container is stripped from the confection.

5. As an article of manufacture, a container for a frozen confection such as ice cream, comprising a blank shaped to form a conical container with overlapped separable marginal portions to permit stripping the container in its entirety from a confection, and closure means for the open end of said container affixed to a portion of said blank away from said marginal portions so as to preclude conflict with the separation of said marginal portions.

ANDREW C. WOOD.